(12) United States Patent
Liou et al.

(10) Patent No.: US 8,962,769 B2
(45) Date of Patent: Feb. 24, 2015

(54) POLYIMIDOTHIOETHERS-INORGANIC NANOPARTICLE HYBRID MATERIAL, INTERMEDIATE THEREOF AND THEIR PREPARATION

(75) Inventors: Guey-Sheng Liou, Taipei (TW); Chia-Liang Tsai, Kaohsiung (TW); Hung-Ju Yen, Kaohsiung (TW); Wen-Chang Chen, Taipei (TW); Wen-Yen Chiu, Taipei (TW); Yang-Yen Yu, Taipei (TW)

(73) Assignee: National Taiwan University, Taipei (TW)

( * ) Notice: Subject to any disclaimer, the term of this patent is extended or adjusted under 35 U.S.C. 154(b) by 281 days.

(21) Appl. No.: 13/535,110

(22) Filed: Jun. 27, 2012

(65) Prior Publication Data

US 2013/0296501 A1    Nov. 7, 2013

(30) Foreign Application Priority Data

May 7, 2012 (TW) .............................. 101116173 A

(51) Int. Cl.
*C08G 75/02* (2006.01)

(52) U.S. Cl.
USPC ...... 525/419; 525/418; 525/420; 525/440.05; 528/170; 528/310; 528/317; 528/321; 528/322; 528/323; 528/374; 528/397; 528/423; 528/425

(58) Field of Classification Search
CPC . C07D 207/416; G02F 1/0018; G02F 1/3611; G02F 1/3614; G02F 1/3615
USPC ............. 525/419, 418, 420, 440.05; 528/170, 528/310, 323, 374, 397, 423, 425, 317, 322
See application file for complete search history.

(56) References Cited

PUBLICATIONS

Yen et al A facile approach towards optically isotropic, colorless, and thermoplastic polyimidothioethers with high refractive index, J. Mater. Chem., 2010, 20, 4080-4084, published on the web Apr. 1, 2010.*
Glatz, et al., "Preparation, cure behavior and properties of bismaleinides containing well defined oligo (phenylene sulfide) segments", High Performance Polymers, Sep. 1, 1993 5:213, pp. 213-218.
Liu, et al., "High refractive index polymers: fundamental research and practical applications", Journal of Materials Chemistry, 2009, pp. 8907-8919.
Terraza, et al., "Synthesis and Properties of Highly Refractive Polyimides Derived from Fluorene-Bridged Sulfur-Containing Dianhydrides and Diamines", Journal of Polymer Science, Vo 46, 2008, pp. 1510-1520.
Liu, et al., "High Refractive Index Polyimides Derived from 2.7-Bis(4-aminophenylenesulfanyl)thianthrene and Aromatic Dianhydrides", Macromolecules 2007, 40, pp. 4614-4620.
You, et al., "Synthesis of High Refractive Index Polyimides Derived from 1, 6-Bis(p-aminophenylsulfanyl)-3, 4, 8, 9-tetrahydro-2, 5 ,7, 10-tetrathiaanthracene and Aromatic Dianhydrides", Macromolecules 2008, 41, pp. 6361-6366.
Liu, et al., "Highly Refractive and Transparent Polyimides Derived from 4,4'-[m-Sulfonylbis(phenylenesulfanyl)]diphthalic Anhydride and Various Sulfur-Containing Aromatic Diamines", Macromolecules 2007, 40, pp. 7902-7909.
Rao, et al., "Preparation and thermal properties of bismaleimide blends based on hydroxy-phenyl maleimide", Polymer International 54, 2005, pp. 1103-1109.

* cited by examiner

*Primary Examiner* — Gregory Listvoyb
(74) *Attorney, Agent, or Firm* — Muncy, Geissler, Olds & Lowe, P.C.

(57) ABSTRACT

The present invention relates to novel polyimidothioethers-inorganic nanoparticle hybrid material, which exhibit good surface planarity, thermal dimensional stability, tunable refractive index, and high optical transparency upon forming into films. The present invention also relates to polyimidothioethers which is an intermediate for preparing the present hybrid material, and their preparation.

12 Claims, 3 Drawing Sheets

Fig. 3
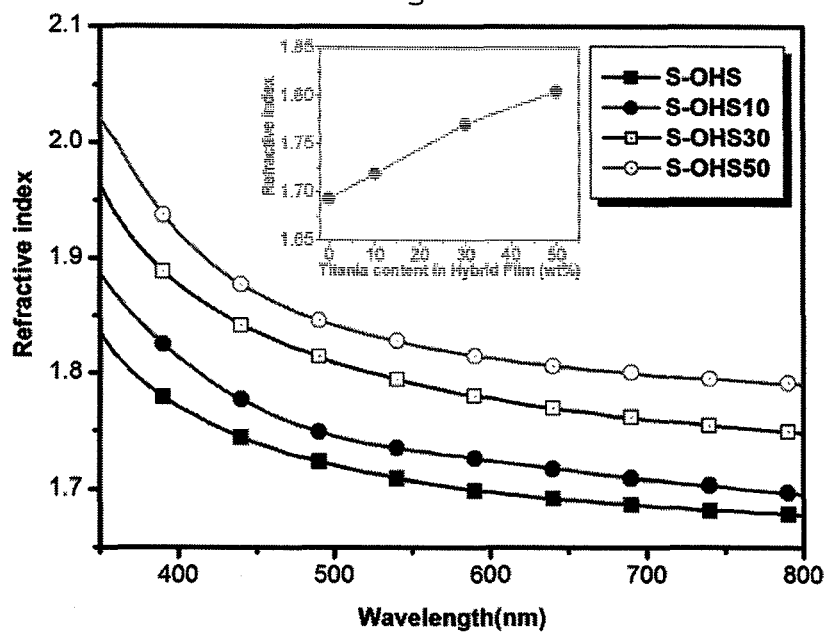
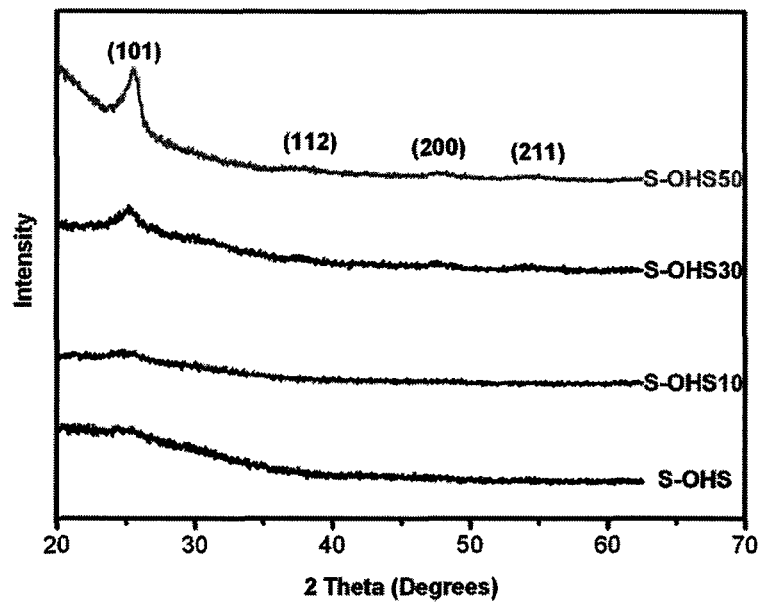
Fig. 4

POLYIMIDOTHIOETHERS-INORGANIC NANOPARTICLE HYBRID MATERIAL, INTERMEDIATE THEREOF AND THEIR PREPARATION

BACKGROUND OF THE INVENTION

1. Technical Field

The present invention relates to novel polyimidothioethers-inorganic nanoparticle hybrid material. More particularly, the present invention relates to polyimidothioethers-inorganic nanoparticle hybrid material, intermediate thereof and their preparation, wherein the hybrid material exhibits good surface planarity, thermal dimensional stability, tunable refractive index, and high optical transparency upon forming into films.

2. Description of Related Art

High refractive index polymers have been widely proposed in recent years for their potential in advanced optoelectronic applications. In addition to the basic parameter of the refractive index, the other ones such as birefringence, Abbe's number, optical transparency, proccessability, and thermal stability are often taken into consideration. Regarding the encapsulants for organic light-emitting diodes (OLEDs), commercial applications require materials with high refractive index, low birefringence, high optical transparency, and a long-term ultraviolet light and thermal stability. Therefore, to achieve a good combination of the above-mentioned parameters is a crucial and on-going issue (J. G. Liu and M. Ueda, *J. Mater. Chem.*, 2009, 19, 8907). Recently, systematic work by Ueda revealed the influence of sulfur groups and related structures on the refractive index and optical dispersion of the resulted polyimides (C. A. Terraza, J. G. Liu, Y. Nakamura, Y. Shibasaki, S. Ando and M. Ueda, *J. Polym. Sci., Part A: Polym. Chem.*, 2008, 46, 1510; N. H. You, Y. Suzuki, D. Yorifuji, S. Ando and M. Ueda, *Macromolecules*, 2008, 41, 6361; J. G. Liu, Y. Nakamura, Y. Shibasaki, S. Ando and M. Ueda, *Macromolecules*, 2007, 40, 4614; & J. G. Liu, Y. Nakamura, Y. Suzuki, Y. Shibasaki, S. Ando and M. Ueda, *Macromolecules*, 2007, 40, 7902). The incorporation of sulfur atom into polymer systems could enhance the refractive index and optical transparency due to its large atomic refraction. It is also well known that the thermoset polyimides derived from bismaleimides (BMIs) exhibit excellent thermal and mechanical properties, thus made them extremely popular for advanced composites and electronics.

In addition, polymer-inorganic hybrid materials had recently attracted considerable interest owing to their enhanced mechanical, thermal, magnetic, optical, electronic, and optoelectronic properties when compared to the corresponding individual polymer or inorganic component. Chemical methods based on in-situ sol-gel hybridization approach made it possible to manipulate the organic/inorganic interfacial interactions at various molecular and nanometer length scales, resulting in homogeneous structures and thus overcoming the problem of nanoparticle agglomeration.

Based on the above mentioned industrial situation, the inventors of the present invention have investigated how to produce polyimides-inorganic nanoparticle hybrid material having optical transparency and thermoplasticity from BMI type monomer, and thus completed the present invention.

SUMMARY OF THE INVENTION

The present invention provides a polyimidothioethers-inorganic nanoparticle hybrid material, which comprises a polymer having repeat units represented by the following formula (I) and inorganic nanoparticles:

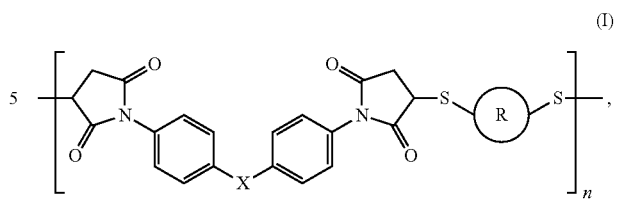

wherein, in the plurality of the repeat units, each X is the same or different and is at least one moiety selected from the group consisting of $C_{1-4}$ alkylene (preferably —$CH_2$—), —S— and —$SO_2$—; and in the plurality of the repeat units, ℝ in each repeat units is the same or different and is at least one moiety selected from the group consisting of $C_{1-4}$ alkylene, $C_{2-4}$ alkylene having at least one hydroxyl substituent, and a moiety of formula: -Ph-S-Ph- (wherein Ph represents phenylene), provided that ℝ in at least one repeat unit represents $C_{2-4}$ alkylene having at least one hydroxyl substituent; and n is a number of from 30 to 250, preferably from 40 to 180; wherein the inorganic nanoparticle is bonded to the polymer through the hydroxyl on ℝ , and the weight ratio of the polymer to the inorganic nanoparticle is from 95:5 to 40:60. In the above mentioned polyimidothioethers-inorganic nanoparticle hybrid material of the present invention, the $C_{2-4}$ alkylene having at least one hydroxyl substituent represented by ℝ is preferably a dihydroxybutylene group.

In the above mentioned polyimidothioethers-inorganic nanoparticle hybrid material of the present invention, the weight average molecular weight of the polymer part is from 16,200 to 312,800, preferably from 21,700 to 225,200.

In the above mentioned polyimidothioethers-inorganic nanoparticle hybrid material of the present invention, the polymer can be consisting of only one type of repeat unit or multiple types of repeat units each having different X and ℝ . For example, the polymer can consisting of a repeat unit in which X is $C_{1-4}$ alkylene and ℝ is $C_{2-4}$ alkylene having at least one hydroxyl substituent and a repeat unit in which X is —S— and ℝ is a group of formula -Ph-S-Ph- (wherein Ph represents phenylene); or consisting of a repeat unit in which X is $C_{1-4}$ alkylene and ℝ is $C_{2-4}$ alkylene having at least one hydroxyl substituent and a repeat unit in which X is —$SO_2$— and ℝ is -Ph-S-Ph- (wherein Ph represents phenylene) simultaneously; or consisting of two or more types of repeat units in which each X and ℝ is defined as above, provided that ℝ in at least one repeat unit represents $C_{2-4}$ alkylene having at least one hydroxyl substituent. In other words, the polymer in the present polyimidothioethers-inorganic nanoparticle hybrid material can be consisting from the various repeat unit (I) as long as at least one ℝ group represents $C_{2-4}$ alkylene having at least one hydroxyl substituent When the polyimidothioethers-inorganic nanoparticle hybrid material of the present invention is formed into a film, in view of providing excellent dimension stability, the polymer not only comprises a repeat unit in which ℝ represents $C_{2-4}$ alkylene having at least one hydroxyl substituent, but also comprises the repeat units in which ℝ represents a group of formula -Ph-S-Ph- (wherein Ph represents phenylene).

In the above mentioned polyimidothioethers-inorganic nanoparticle hybrid material of the present invention, the inorganic nanoparticle is at least one oxide selected form the group consisting of titanium oxide, zirconium oxide, cerium oxide and silicon oxide.

In the above mentioned polyimidothioethers-inorganic nanoparticle hybrid material of the present invention, the hydroxyl group on the ℝ of the repeat units of formula (I) is to provide the bonding site with the inorganic nanoparticle.

According to the polyimidothioethers-inorganic nanoparticle hybrid material of the present invention, when producing into a film, the film has a refractive index of from 1.63 to 1.80 and a birefringence of from 0.0005 to 0.0034 of the polyimidothioethers, and transmittance of greater than 85% in the visible region (i.e. a range of wavelengths from 450 to 800 nm).

The present invention further relates to a method for preparing the present polyimidothioethers-inorganic nanoparticle hybrid material, comprising hydrolysis-condensing a polymer having the repeat units of formula (I) with an inorganic nanoparticle precursor through staged heating by using a sol-gel method under acidic conditions to obtain the polyimidothioethers-inorganic nanoparticle hybrid material. The term "staged heating" refers to the progress for curing the hybrid material at two or more temperatures each maintaining a certain period (for example, heating up to 150° C.). For example, the hybrid material is first pre-baked at 60° C. for 1 to 8 hours, and subsequently baked at 120° C. for 60 to 180 minutes. The resultant cured hybrid material is optionally further subjected to a hydrothermal process in 100° C. water, depending on the type of the inorganic nanoparticle precursor. Finally, the resultant material is dried at 100° C. for 5 to 8 hours in a vacuum oven.

In the method for preparing the polyimidothioethers-inorganic nanoparticle hybrid material of the present invention, the inorganic nanoparticle precursor comprises alkoxide of titanium, zirconium, cerium and silicon, and the weight ratio of the polymer having the repeat unit of formula (I) to the inorganic nanoparticle precursor is from 95:5 to 40:60, preferably from 90:10 to 50:50.

In the method for preparing the polyimidothioethers-inorganic nanoparticle hybrid material of the present invention, the acidic condition which the hydrolysis-condensation carried out means a pH ranging from 4 to 7, which can be adjusted via adding acids, such as HCl.

In the method for preparing the polyimidothioethers-inorganic nanoparticle hybrid material of the present invention, when the inorganic nanoparticle precursor is titanium alkoxide, the method further comprises a hydrothermal processing step for allowing the titanium oxide in the hybrid material to grow crystal into anatase type titanium oxide, which would increase the refreactive index of the hybrid material while imparting transparency without yellowing or discoloration. The term "hydrothermal processing step" refers to heating the hybrid material at 100° C. steam for several hours, preferably 8 to 12 hours, to allow the titanium oxide to grow crystal into anatase, resulting in increasing the refreactive index of the hybrid material. After hydrothermal processing step, the hybrid material is then dried at 100° C. in a vacuum oven.

The present invention further relates to a polyimidothioether intermediate, which comprises repeat units represented by the following formula (I):

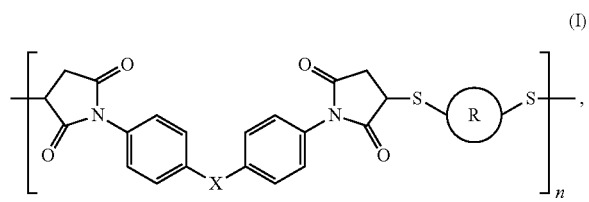

wherein, in the plurality of the repeat units, each X is the same or different and is at least one moiety selected from the group consisting of $C_{1-4}$ alkylene (preferably —$CH_2$—), —S— and —$SO_2$—; and Ⓡ in each repeat units is the same or different and is at least one moiety selected from the group consisting of $C_{1-4}$ alkylene, $C_{2-4}$ alkylene having at least one hydroxyl substituent, and a moiety of formula: -Ph-S-Ph- (wherein Ph represents phenylene), provided that Ⓡ in at least one repeat unit represents $C_{2-4}$ alkylene having at least one hydroxyl substituent; and n is a number of from 30 to 250, preferably from 40 to 180.

The weight average molecular weight of polyimidothioether of the present invention is in a range of from 16,200 to 312,800, preferably from 21,700 to 225,200.

The polyimidothioether of the present invention is useful as an intermediate for synthesis the polyimidothioethers-inorganic nanoparticle hybrid material of the present invention.

The present invention further relates to a method for preparing the present polyimidothioether intermediate, comprising: subjecting a bismaleimide of the following formula (II)

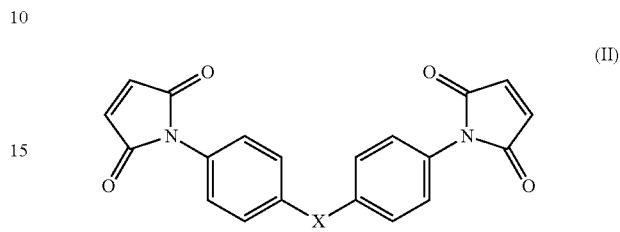

(wherein X is as defined above) to a Michael polyaddition reaction with a dithiol of the following formula (III):

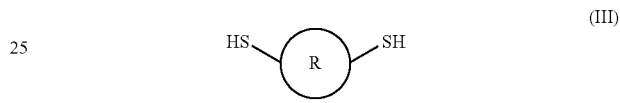

(wherein Ⓡ is as defined above).

The above polyaddition reaction can be carried out in a solvent at room temperature in the presence of base as a catalyst.

In the above polyaddition reaction, the molar ratio of the bismaleimide of formula (II) to the dithiol of formula (III) is from 0.90:1.10 to 1.10:0.90, preferably from 0.95:1.05 to 1.05:0.95.

In the above polyaddition reaction, examples of the dithiol include (but is not limited to) 4,4'-thiobisbenzenethiol (DT-S), (2S,3R)-1,4-dimercapto-butane-2,3-diol (DT-OH), such dithiols can be used in one kind, or in a mixture of at least two kinds.

In the above polyaddition reaction, examples of the base catalyst include one or more selected from triethylamine, tri-n-propylamine, triisopropylamine, tri-n-butylamine and N,N,N',N'-tetramethylethylenediamine. The solvent used in the reaction can be any type as long as it would not result in any adverse effects on the reaction, for example, a phenolic solvent including phenol, 4-methylphenol, m-cresol, etc., can be used as the solvent in the polyaddition reaction.

BRIEF DESCRIPTION OF THE DRAWINGS

FIG. 3 is a graph showing the variation of the refractive index of the polyimidothioether copolymer film prepared in Synthesis Example 5 and the hybrid material films prepared in Examples 1 to 3 with wavelength. The insert figure shows the variation of refractive index at 633 nm with titania content.

FIG. 4 is a graph showing XRD patterns of the polyimidothioether copolymer film prepared in Synthesis Example 5 and the hybrid material films prepared in Examples 1 to 3.

DETAILED DESCRIPTION OF THE INVENTION

Figure 1:
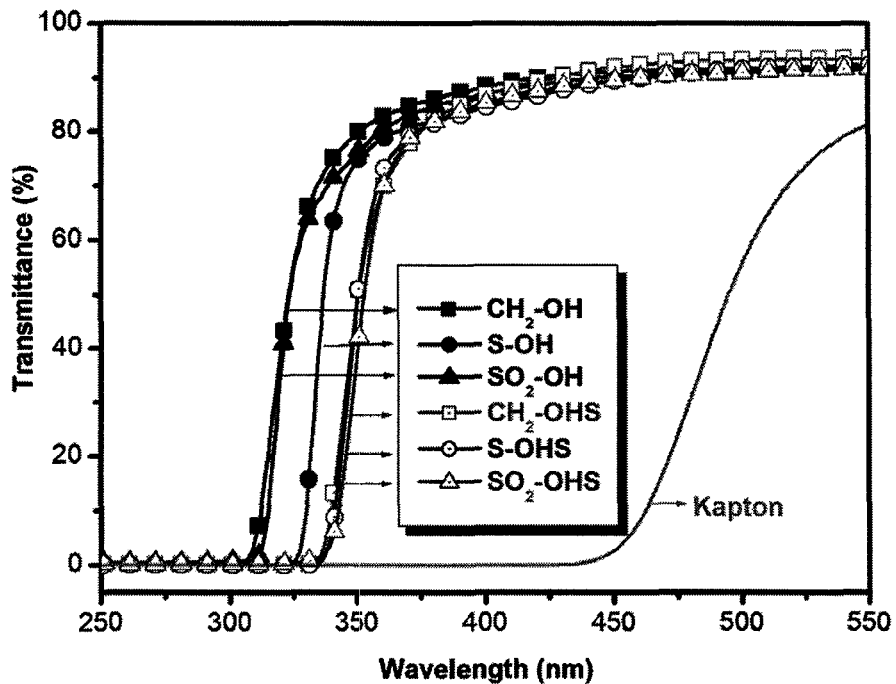
FIG. 1 is a graph showing the optical transmission spectra of polyimidothioether polymers prepared in Synthesis Examples 2 to 7.

In the polyimidothioether having repeat units of formula (I) of the present invention, the $C_{1-4}$ alkylene represented by X in formula (I) means a straight chain or branched chain alkylene containing 1 to 4 carbon atoms, for example, methylene, ethylene, propylene, isopropylene, butylene, isobutylene, etc, preferably methylene (—$CH_2$—).

Similarly, in the polyimidothioether having repeat units of formula (I) of the present invention, the $C_{1-4}$ alkylene represented by Ⓡ in formula (I) means a straight chain or branched chain alkylene containing 1 to 4 carbon atoms, for example, methylene, ethylene, propylene, isopropylene, n-butylene, isobutylene, etc, preferably n-butylene.

The $C_{2-4}$ alkylene having at least one hydroxyl substituent, represented by Ⓡ in formula (I) means a straight chain or branched chain containing 2 to 4 carbon atoms and having at least one, preferably at least two hydroxyl substituents, such as hydroxylethylene, 1,2-dihydroxylethylene, 1-hydroxylpropylene, 2-hydroxylpropylene, 1,2-dihydroxylpropylene, 1,3-dihydroxylpropylene, 1-hydroxyl-n-butylene, 2-hydroxyl-n-butylene, 1,2-dihydroxyl-n-butylene, 1,3-dihydroxyl-n-butylene, 2,3-dihydroxyl-n-butylene, etc.

EXAMPLES

The starting material of the present invention, bismaleimide, which is represented by formula (II), is synthesized by conventional methods. For example, it can be synthesized by reacting corresponding diaminodiphenylsulfide with maleic anhydride according to the method described in F. P. Glatz and R. Mulhaup, *High Performance Polymers*, 1993, 5, 213, or reacting diaminodiphenylsulfone with maleic anhydride according to the method described in B. S. Rao, R. Sireesha and A. R. Pasala, *Polym. Int.*, 2005, 54, 1103. Specific examples will described in the following Synthesis Examples. Certain bismaleimide of formula (II) such as 4,4'-(diaminodiphenylmethane)bismaleimide ($CH_2$-BMI) is commercially available.

Material 4,4'-(diaminodiphenylsulfide)bismaleimide (S-BMI) (corresponding to X representing —S— in the formula (II)) was synthesized by reacting 4,4'-diaminodiphenylsulfide with maleic anhydride according to the method described in F. P. Glatz and R. Mulhaup, *High Performance Polymers*, 1993, 5, 213, mp: 187° C. 4,4'-(diaminodiphenylsulfone)bismaleimide ($SO_2$-BMI) (corresponding to X representing —$SO_2$— in the formula (II)) was synthesized by reacting 4,4'-diaminodiphenylsulfone with maleic anhydride according to the method described in B. S. Rao, R. Sireesha and A. R. Pasala, *Polym. Int.*, 2005, 54, 1103, mp: 252° C. 4,4'-(diamino-diphenylmethane)bismaleimide ($CH_2$-BMI) (corresponding to X representing —$CH_2$— in the formula (II)), (2S,3R)-1,4-dimercaptobutane-2,3-diol (DT-OH) and 4,4'-thiobisbenzenethiol (DT-S) were received from commercial sources and were used as received.

Synthesis Example 1

Synthesis of S-BMI and $SO_2$-BMI

To a 250 ml three-neck round bottomed flask equipped with addition tube and purged with nitrogen gas, an acetone solution (100 ml) containing 9.44 g (96.28 mmol) of maleic anhydride was added. Then, an acetone solution (40 ml) containing 8.87 g (41.00 mmol) of compound 1 was slowly added dropwise into the three-neck round bottomed flask through the addition tube, and stirred at −5° C. to carry out reaction for 12 hours. After the reaction completed, the solid was filtered and washed with acetone to give 16.84 g (99.6% in yield) of light yellow solid product 2 after drying.

A 250 ml three-neck round bottomed flask was equipped with addition tube and purged with nitrogen gas, and then placed in oil bath. To the three-neck round bottomed flask, an acetone solution (180 ml) containing 16.84 g (40.83 mmol) of compound 2 and 3.75 g (45.72 mmol) of sodium acetate anhydrous were added. Then, 32.61 g (319.42 mmol) of acetic anhydride was slowly added dropwise into the three-neck round bottomed flask through the addition tube. The mixture was warmed to 80° C. slowly, refluxed and mixed for 10 hours. After washing and crystallization, 9.20 g of light yellow solid product 3 (60.0% in yield) was obtained. The flow chart of the aforementioned reaction is as follows (scheme 1):

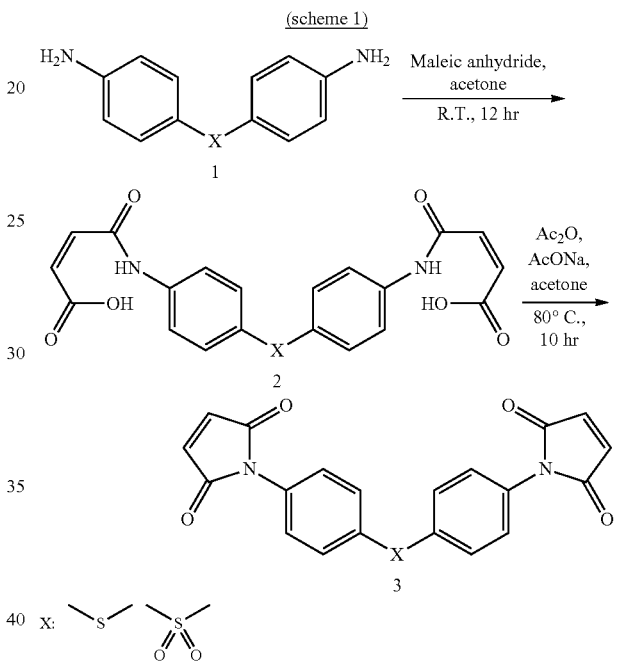

Polymer Synthesis

Synthesis Example 2

Synthesis of 4,4'-(diaminodiphenylsulfide)bismaleimide-2,3-dihydroxylbutylenedithioether polymer (S—OH)

S-BMI (1.8819 g, 5 mmol) was dissolved in 12 ml of m-cresol, and (2S,3R)-1,4-dimercaptobutane-2,3-diol (DT-OH) (0.7712 mg, 5 mmol) was added into the mixture and stirred for 10 minutes. Then, 25 μl of triethylamine was slowly added to carry out Michael polyaddition reaction for 4 hours at room temperature. During the polyaddition reaction, the viscosity of the solution gradually increased. Then the resultant polymer solutions were added into 300 ml of acidic methanol to allow the polymer precipitated as white fibroid solid. The precipitates were collected by filtration and washed thoroughly with methanol and dried in vacuum at 100° C. For further purification, the precipitation from dimethyl acetamide (DMAc) to methanol was conducted twice. The obtained S—OH polymer (corresponding to polymer having the repeat units represented by the above formula (I), wherein X is —S— and Ⓡ is $C_{2-4}$ alkylene having at least one hydroxyl substituent) has a weight average molecular weight of 132,100. The flow chart of the aforementioned reaction is as follows (scheme 2):

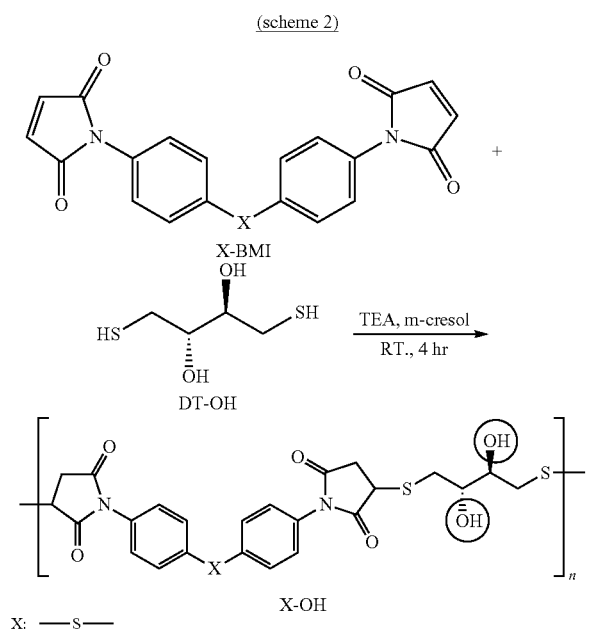

Synthesis Example 3

Synthesis of 4,4'-(diaminodiphenylmethane)bismaleimide-2,3-dihydroxylbutylenedithioether polymer (CH$_2$—OH)

CH$_2$—OH polymer (corresponding to polymer having the repeat units represented by the above formula (I), wherein X is —CH$_2$— and Ⓡ is C$_{2-4}$ alkylene having at least one hydroxyl substituent) was prepared by the same procedures described in Synthesis Example 2 except that S-BMI was instead of CH$_2$-BMI. The obtained polymer has a weight average molecular weight of 133,700.

Synthesis Example 4

Synthesis of 4,4'-(diaminodiphenylsulfone)bismaleimide-2,3-dihydroxylbutylenedithioether polymer (SO$_2$—OH)

SO$_2$—OH polymer (corresponding to polymer having the repeat units represented by the above formula (I), wherein X is —SO$_2$— and Ⓡ is C$_{2-4}$ alkylene having at least one hydroxyl substituent) was prepared by the same procedures described in Synthesis Example 2 except that S-BMI was instead of SO$_2$-BMI. The obtained polymer has a weight average molecular weight of 103,700.

Synthesis Example 5

Synthesis of 4,4'-(diaminodiphenylsulfide)bismaleimide-2,3-dihydroxylbutylenedithioether-co-4,4'-(diaminodiphenylsulfide)bismaleimide-4,4'-thiodiphenylsulfide copolymer (S—OHS)

S-BMI (1.8819 g, 5 mmol) was dissolved in 12 ml of m-cresol, and 4,4'-thiobisbenzenethiol (DT-S) (0.6260 mg, 2.5 mmol) and (2S,3R)-1,4-dimercaptobutane-2,3-diol (DT-OH) (0.3856 mg, 2.5 mmol) were added into the mixture and stirred for 10 minutes. Then, 25 μl of triethylamine was slowly added to carry out Michael polyaddition reaction for 4 hours at room temperature. During the polyaddition reaction, the viscosity of the solution gradually increased. Then the resultant polymer solutions were added into 300 ml of acidic methanol to allow the polymer precipitated as white fibroid solid. The precipitates were collected by filtration and washed thoroughly with methanol and dried in vacuum at 100° C. For further purification, the precipitation from dimethyl acetamide (DMAc) to methanol was conducted twice. The obtained S—OHS polymer (corresponding to polymer having the repeat units represented by the above formula (I), wherein X is —S— and Ⓡ represents C$_{2-4}$ alkylene having at least one hydroxyl substituent and a formula: -Ph-S-Ph- (wherein Ph represents phenylene)) has a weight average molecular weight of 120,500. The flow chart of the aforementioned reaction is as follows (scheme 3):

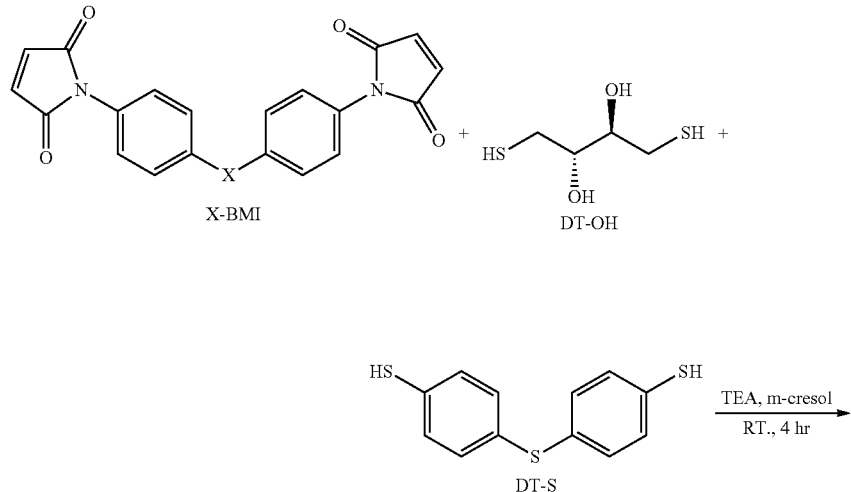

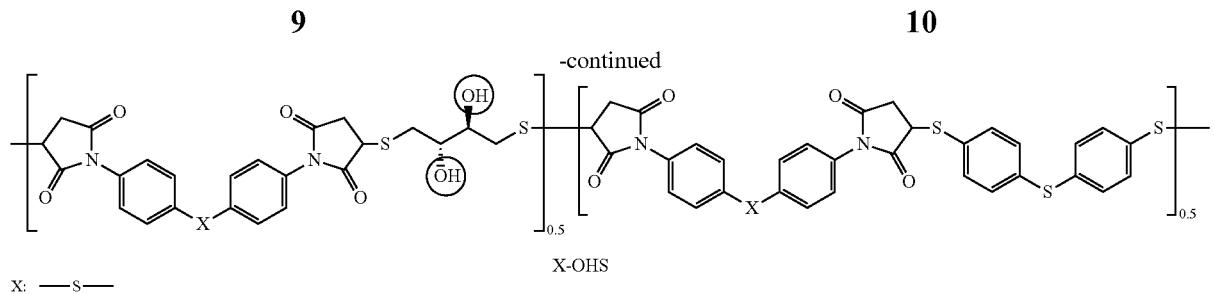

X-OHS

The obtained S—OHS had inherent viscosities in the range of 0.33-1.25 dL/g (measured at a concentration of 0.5 g/dL in DMAc at 30° C. using Tamson TV-200 viscometer). IR (measured by Fourier Transform Infrared spectrometer (FTIR)) (KBr, v cm$^{-1}$): 3200-3700 (O—H stretch), 1781 (asymmetry C=O stretch), 1713 (symmetry C=O stretch), 1383 (C—N), 1082 (Ar—S—Ar stretch), 725 (imide ring deformation), respectively. Anal. Calcd. (%) for S—OHS ($C_{58}H_{50}N_4O_{10}S_7)_n$ (1187.49)$_n$:C, 58.66; H, 4.24; N, 4.72; S, 18.90. Found: C, 56.65; H, 3.97; N, 4.69; S, 18.62.

Synthesis Example 6

Synthesis of 4,4'-(diaminodiphenylmethane)bismaleimide-2,3-dihydroxylbutylenedithioether-co-4,4'-(diaminodiphenylmethyl)bismaleimide-4,4'-thiodiphenylsulfide copolymer $CH_2$-BMI (1.7917 g, 5 mmol) was dissolved in 12 ml of m-cresol, and 4,4'-thiobisbenzenethiol (DT-S) (0.6260 mg, 2.5 mmol) and (2S,3R)-1,4-dimercaptobutane-2,3-diol (DT-OH) (0.3856 mg, 2.5 mmol) were added into the mixture and stirred for 10 minutes. Then, 25 μl of triethylamine was slowly added to carry out Michael polyaddition addition for 4 hours at room temperature. During the polyaddition addition, the viscosity of the solution gradually increased Then the resultant polymer solutions was added into 300 ml of acidic methanol to allow the polymer precipitated as white fibroid solid. The precipitates were collected by filtration and washed thoroughly with methanol and dried in vacuum at 100° C. For further purification, the precipitation from dimethyl acetamide (DMAc) to methanol was conducted twice. The obtained $CH_2$—OHS polymer (corresponding to polymer having the repeat units represented by the above formula (I), wherein X is —$CH_2$— and Ⓡ represents $C_{2-4}$ alkylene having at least one hydroxyl substituent and a formula: -Ph-S-Ph- (wherein Ph represents phenylene)) has a weight average molecular weight of 123,700.

Synthesis Example 7

Synthesis of 4,4'-(diaminodiphenylsulfone)bismaleimide-2,3-dihydroxylbutylenedithioether-co-4,4'-(diaminodiphenylsulfone)bismaleimide-4,4'-thiodiphenylsulfide copolymer $SO_2$-BMI (2.0419 g, 5 mmol) was dissolved in 12 ml of m-cresol, and then 4,4'-thiobisbenzenethiol (DT-S) (0.6260 mg, 2.5 mmol) and (2S,3R)-1,4-dimercaptobutane-2,3-diol (DT-OH) (0.3856 mg, 2.5 mmol) were added into the mixture and stirred for 10 minutes. Then, 25 μl of triethylamine was slowly added to carry out Michael polyaddition addition for 4 hours at room temperature. During the polyaddition reaction, the viscosity of the solution gradually increased. Then the resultant polymer solutions were added into 300 ml of acidic methanol to allow the polymer precipitated as white fibroid solid. The precipitates were collected by filtration and washed thoroughly with methanol and dried in vacuum at 100° C. For further purification, the precipitation from dimethyl acetamide (DMAc) to methanol was conducted twice. The obtained $SO_2$—OHS polymer (corresponding to polymer having the repeat units represented by the above formula (I), wherein X is —$SO_2$— and Ⓡ represents $C_{2-4}$ alkylene having at least one hydroxyl substituent and a formula: -Ph-S-Ph- (wherein Ph represents phenylene)) has a weight average molecular weight of 119,700.

Experimental Example 1

Preparation of Polyimidothioether Films

N-methyl-2-pyrrolidone (NMP) solution dissolving with the synthesized polyimidothioether copolymer of Synthesis Examples 2 to 7 (concentration ranged between 12.0 to 18.0 wt %) was drop-coated onto fused silica (amorphous $SiO_2$) or glass substrates and dried at 80° C. for 6 hours, and then at 150° C. for 8 hours under vacuum condition. Finally, polyimidothioether films with thicknesses of 20 μm were obtained and used for solubility tests, refractive index, transmittance, and thermal analyses. The results were shown in the following Table 1, where commercial optical film Kapton was used as a control. The optical transmission spectra of each film were shown in FIG. 1. It can be seen from FIG. 1 that all the polymer films exhibited high transparency (>85%) in visible region (wavelengths: 450 to 800 nm).

TABLE 1

| | Properties of Polyimidothioethers | | | | | | |
|---|---|---|---|---|---|---|---|
| | | Thermal Properties (° C.) | | | Optical Properties | | |
| Index | $\eta_{inh}$ (dL/g)$^a$ | $T_s^b$ | $T_d^c$ | $\Delta T^d$ | $\lambda_0$ (nm)$^e$ | $n^f$ | $\Delta n^g$ |
| $CH_2$—OH | 1.25 | 80 | 301 | 221 | 310 | 1.637 | 0.0031 |
| S—OH | 1.01 | 85 | 303 | 218 | 327 | 1.660 | 0.0018 |
| $SO_2$—OH | 0.35 | 92 | 267 | 175 | 312 | 1.648 | 0.0045 |
| $CH_2$—OHS | 0.46 | 85 | 304 | 219 | 336 | 1.672 | 0.0005 |
| S—OHS | 0.50 | 103 | 317 | 214 | 338 | 1.692 | 0.0010 |

TABLE 1-continued

Properties of Polyimidothioethers

| Index | $\eta_{inh}$ (dL/g)[a] | Thermal Properties (° C.) | | | Optical Properties | | |
|---|---|---|---|---|---|---|---|
| | | $T_s{}^b$ | $T_d{}^c$ | $\Delta T^d$ | $\lambda_0$ (nm)[e] | $n^f$ | $\Delta n^g$ |
| SO$_2$—OHS | 0.33 | 110 | 281 | 171 | 337 | 1.680 | 0.0022 |
| Kapton | | | | | 452 | 1.687 | 0.0770 |

[a] Measured at a polymer concentration of 0.5 g/dL in DMAc at 30° C.
[b] Softening temperature measured by TMA with a constant applied load of 10 mN at a heating rate of 10° C. min$^{-1}$ by penetration mode.
[c] Initial decomposition temperature recorded by TGA.
[d] The melting-process window ($\Delta T$) was calculated as $\Delta T = T_d - T_s$.
[e] The cutoff wavelength ($\lambda_0$) from the UV-vis transmission spectra of polymer films (thickness ~20 μm).
[f] Refractive index at 633 nm by ellipsometer.
[g] The in-plane/out-of-plane birefringence ($\Delta n$) was calculated as $\Delta n = n_{TE} - n_{TM}$ were measured using a prism coupler.

From the above Table 1, these polyimidothioether films revealed the ultra-lowest birefringence values in the range of 0.0005 to 0.0034 and refractive indices about 1.63 to 1.69. Regarding optical transparency, as shown in Table 1, $\lambda_0$ value of the polyimidothioether films of the present invention was between 300 nm to 350 nm (outside of the range of visible wavelength), whereas $\lambda_0$ value of the commercial Kapton optical film was 452 nm (in the range of visible wavelength). Thus, the commercial Kapton optical film reveal color under visible light. In addition, as shown in Table 1, the polyimidothioether films of the present invention exhibited good thermal stability with insignificant weight loss up to 260° C. Accordingly, the polyimidothioether films of the present invention have excellent transparency in visible light region and low chromaticity, indicated their potential optical applications.

Example 1

0.117 g (0.10 mmol) of S—OHS solution of Synthesis Example 5 was dissolved in 5 ml of dimethylacetamide, then 0.498 g (1.46 mmol) of Ti(OBu)$_4$ was added drop-wise into the above solution by a syringe and stirred thoroughly. To the above mixture, 0.167 g (37 wt %) of HCl was added very slowly and further stirred at room temperature for 30 minutes to carry out hydrolysis condensation thus to obtain a precursor solution. The resulting precursor solution was filtered through a 0.45 mm PTFE filter and the filtered solution was then drained into film at room temperature for 6 hours under vacuum condition. The film was soft baked at 60° C. for 6 hours, baked at 120° C. for 150 minutes and then treated by hydrothermal process at 100° C. steam for 12 hours. Finally, the film was dried at 100° C. to obtain a hybrid film having 50 wt % of titanium oxide, called S—OHS50 for short, where the number 50 refers to the weight ratio of titanium oxide in the film.

Example 2

A hybrid film having 10 wt % of titanium oxide (called S—OHS 10 for short) was prepared by the same procedures described in Example 1 except that the weight ratio of S—OHS:Ti(OBu)$_4$ was changed to 90:10.

Example 3

A hybrid film having 30 wt % of titanium oxide (called S—OHS30 for short) was prepared by the same procedures described in Example 1 except that the weight ratio of S—OHS:Ti(OBu)$_4$ was changed to 70:30.

The flow chart of the aforementioned reaction is as follows (scheme 4):

scheme 4

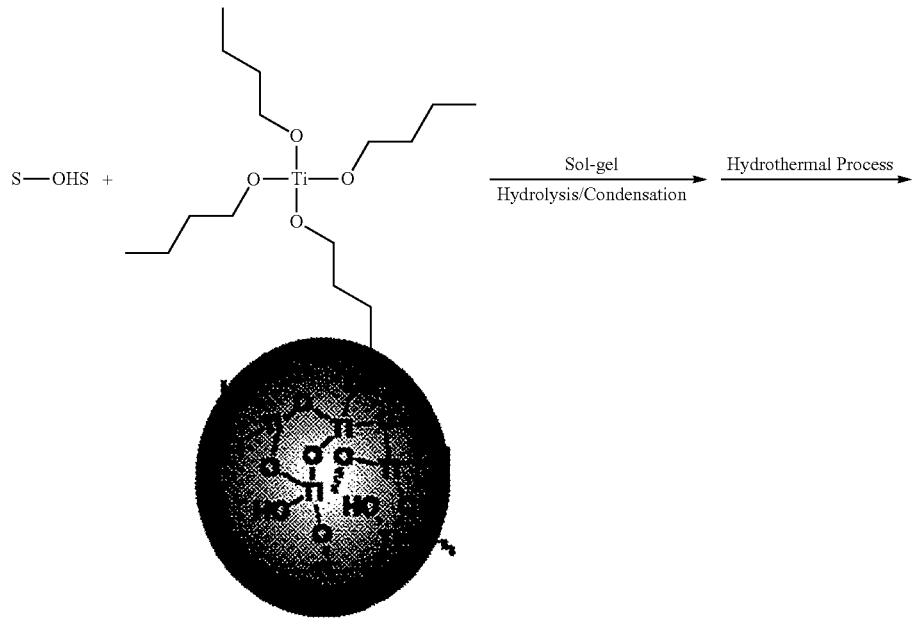

-continued

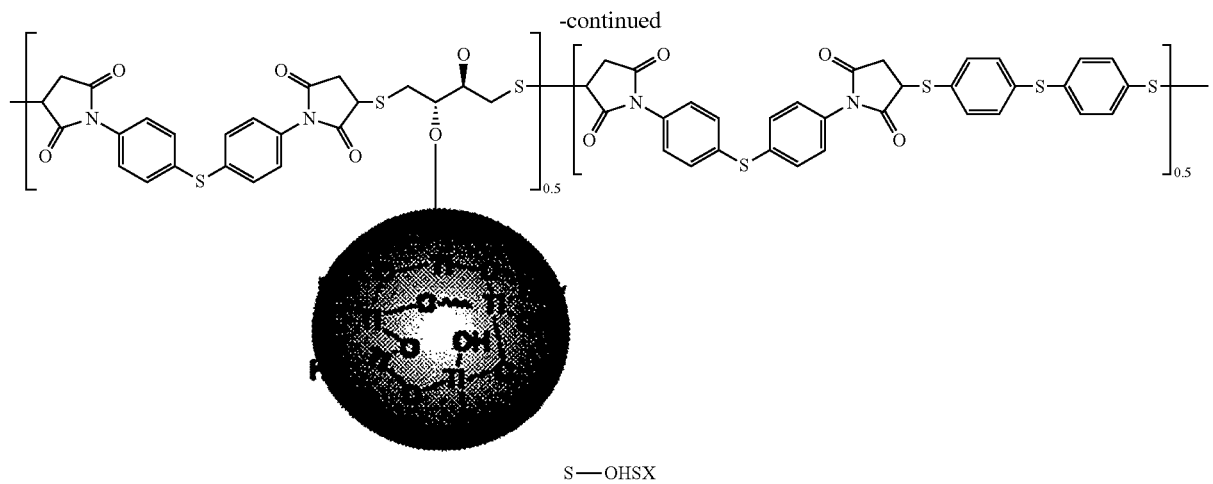

S—OHSX

X in S—OHSX of the above scheme refers to the weight percentage of titanium dioxide in the hybrid material.

Figure 5:
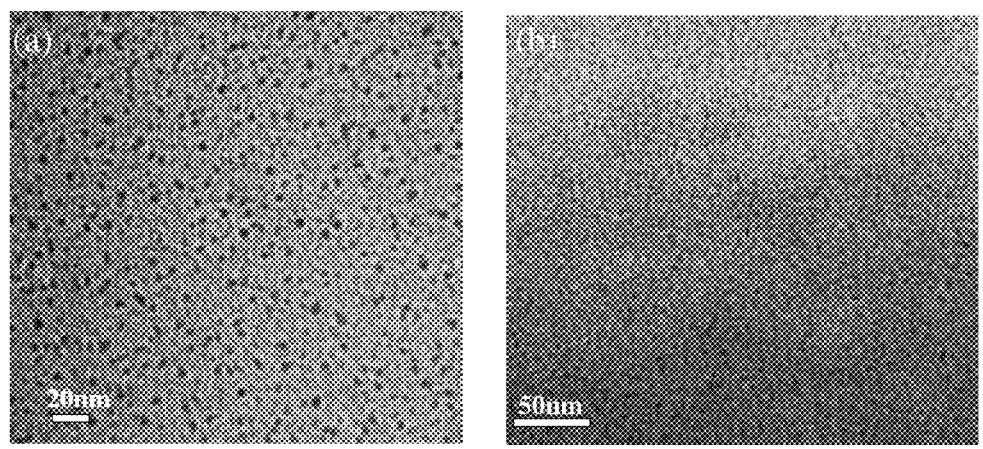
FIG. 5 is a TEM image of the hybrid material film prepared in Example 1, (a) top view, (b) cross-section.

The reactant composition, weight percentage of titanium dioxide in the hybrid films, and the thickness, toughness and refractive index of the polyimidothioether film prepared by the polymer of Synthesis Example 5 and the hybrid films of Examples 1 to 3 were shown in the following Table 2, and the optical and thermal properties were shown in the following Table 3, XRD patterns was shown in FIG. 4. TEM image of the hybrid film of Example 1 was shown in FIG. 5, (a) top view, (b) cross-section.

nium dioxide contents, suggesting that the Ti—OH groups of the hydrolyzed precursor condensed progressively to form the Ti—O—Ti structures and resulted in an enhanced refractive index. Furthermore, the refractive index of the hybrid film can be enhanced obviously owing to the $TiO_2$ in the hybrid film can be crystallized via hydrothermal treatment, and the transparency of the hybrid film can be maintained without yellowing. FIG. 4 revealed that the intensity of a titanina crystalline peak gradually increased with increasing titania content, suggesting that the titania clusters were well dispersed in polymers because of hydrolysis-condensation

TABLE 2

Reaction composition and properties of the polyimidothioether film prepared by the polymer of Synthesis Example 5 and the hybrid films of Examples 1 to 3

| | Reactant compostition (wt %) | | Hybrid film $TiO_2$conten (wt %) | | | | |
|---|---|---|---|---|---|---|---|
| Polmer | S-OHS | $Ti(OBu)_4$ | Theoretical | Experimental[a] | $h^b$/nm | $R_q{^c}$/nm | $n^d$ |
| S—OHS | 100 | 0 | 0 | 0 | 253 | 2.035 | 1.69 |
| S—OHS10 | 67.8 | 32.2 | 10 | 9.8 | 271 | 1.874 | 1.72 |
| S—OHS30 | 35.4 | 64.6 | 30 | 28.3 | 284 | 1.263 | 1.77 |
| S—OHS50 | 19.0 | 81.0 | 50 | 49.4 | 325 | 0.951 | 1.80 |

[a]Experimental titania content estimated from TGA curves.
[b]h: Film thickness.
[c]$R_q$: The root mean square roughness.
[d]n: Refractive index at 633 nm by ellipsometer.

TABLE 3

Thermal Properties of the polyimidothioether film prepared by the polymer of Synthesis Example 5 and the hybrid films of Examples 1 to 3

| | | CTE | $Td^5$/° C.[c] | | $Td^{10}$/° C.[c] | | |
|---|---|---|---|---|---|---|---|
| Polmer | $Ts^a$ | (ppm/K)[b] | $N_2$ | Air | $N_2$ | Air | $R_{w800}$(%)[d] |
| S—OHS | 103 | 88 | 320 | 325 | 345 | 355 | 33 |
| S—OHS10 | 172 | 72 | 380 | 405 | 450 | 470 | 61 |
| S—OHS30 | 205 | 57 | 400 | 410 | 460 | 470 | 69 |
| S—OHS50 | 231 | 45 | 390 | 390 | 450 | 450 | 76 |

[a]Softening temperature measured by TMA with a constant applied load of 10 mN at a heatingrate of 10° C. $min^{-1}$ by penetration mode.
[b]The CTE data was determined over a 50-200° C. range by expansion mode.
[c]Temperature at which 5% and 10% weight loss occurred, respectively, recorded by TGA at a heating rate of 20° C. $min^{-1}$ and a gas flow rate of 30 $cm^3$ $min^{-1}$.
[d]Residual weight percentages at 800° C. under nitrogen flow.
[f]Experimental titania content estimated from TGA curves.

Figure 2:
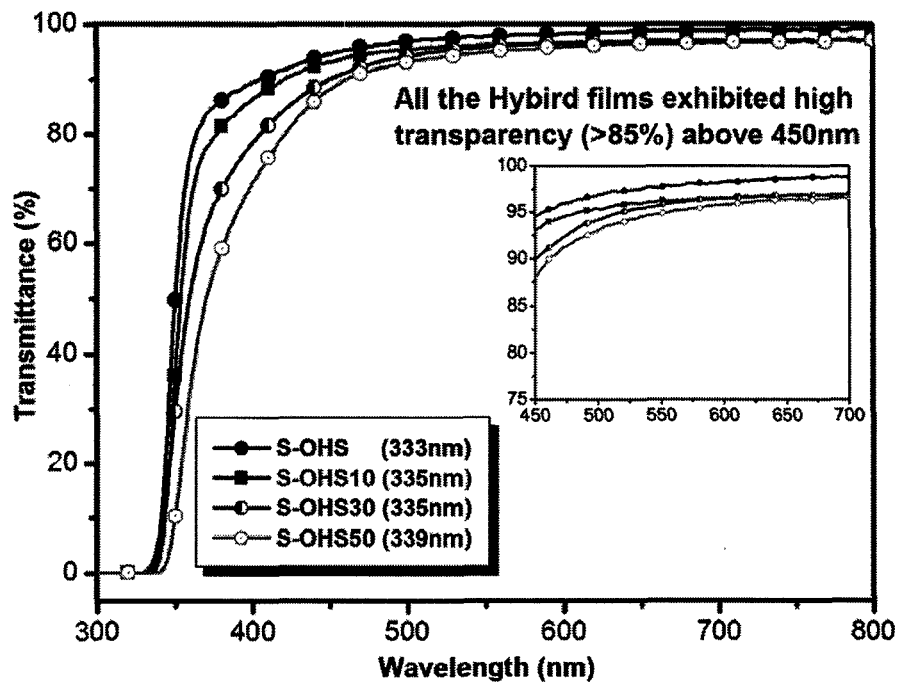
FIG. 2 is a graph showing the transmittance UV-visible spectra of the polyimidothioether copolymer film prepared in Synthesis Example 5 and the hybrid material films (thickness: 15±3 μm) prepared in Examples 1 to 3.

As shown in FIG. 2, the refractive index at 633 nm of the hybrid material film increased linearly with increasing titareactions occurred between $Ti(OBu)_4$ and pendent hydroxyl groups of the polyimidothioether polymer. The hybrid film shown in FIG. 5 exhibited the titania nanocrystallites with the average size of 3 to 5 nm and well dispersed in the hybrid material.

In Table 2, the ratio of surface roughness to film thickness (Rq/h) was less than 0.15% implying the excellent surface planarity of the hybrid film. In addition, as can be seen in Table 3, the softening temperature increased from 103° C. to 231° C. with the increasing titania content, and CTE of the hybrid films decreased with increasing the volume fractions of inorganic reinforcement.

Example 2

Preparation of Multilayer Antireflection Coating Films

Figure 6:
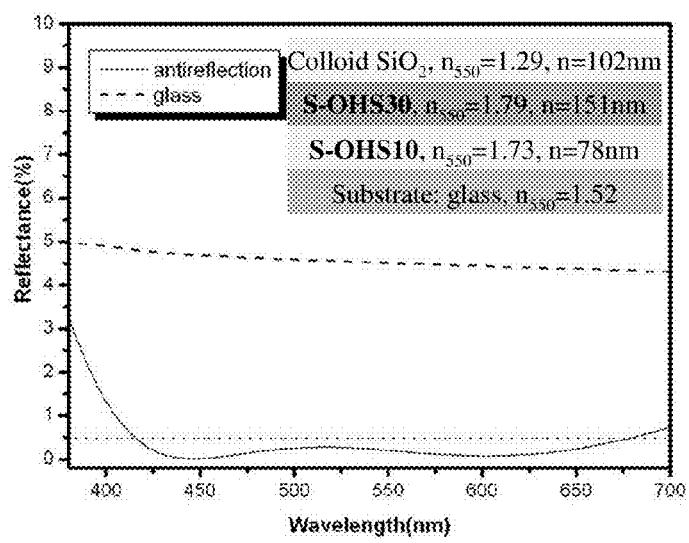
FIG. 6 is a graph showing the variation of the reflectance with wavelength of the three-layer antireflection coating film prepared in Example 2.

Onto the glass substrate, SiO2, S—OHS30 prepared by Example 3 and S—OHS10 prepared by Example 2 were coated in sequence, the thickness and refractive index were 102 nm and 1.29; 151 nm and 1.79; 78 nm and 1.73, respectively. The glass substrate usually revealed a refractive index (n=1.52) higher than air (n=1.0) and had an average reflectance of about 4.5% in the visible range. As shown in FIG. 6, the reflectance of prepared anti-reflection coatings was less than 0.7% in the visible range (400 nm to 700 nm), which was significantly smaller than that of the glass with 4.5%. Thus, it suggested the potential application of the prepared hybrid films in optical devices.

According to the present invention, a series of thermoplastic polyimidothioethers are readily prepared from a variety of bismaleimides and dithiols through the Michael polyaddition, then the bonding between organic and inorganic materials is provided by utilizing the hydroxyl group on the polyimidothioethers, and hence hydrolytic condensation with an inorganic oxide precursor occurs to obtain a hybrid material of polyimidothioethers-inorganic nanoparticles where inorganic nanoparticles are fully dispersed in the polyimidothioether polymer. Furthermore, according to the method of the present invention, it is easy to control the proportion of inorganic nanoparticles in the film of the hybrid material and hence the desired optical properties. In addition, a considerably high amount of titanium oxide may be added thereto and a refractive index up to 1.80 may be achieved, so it has potential for use in optical applications.

Moreover, due to its good solubility in organic solvents, the polyimidothioethers-inorganic nanoparticle hybrid material of the present invention is suitable for solution-casting, spin-coating, inkjet-printing or injection-molding processes for optical practical applications.

What is claimed is:

1. A polyimidothioethers-inorganic nanoparticle hybrid material, which comprises a polymer having repeat units represented by the following formula (I) and inorganic nanoparticles:

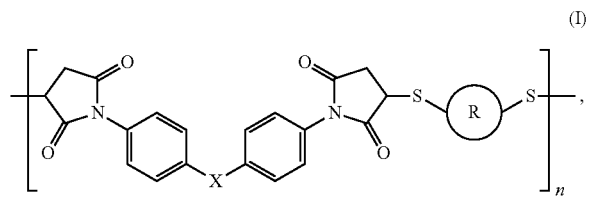

wherein, in the plurality of the repeat units, each X is the same or different and is at least one moiety selected from the group consisting of $C_{1-4}$ alkylene, —S— and —SO$_2$—; and
in the plurality of the repeat units, Ⓡ in each repeat units is the same or different and is at least one moiety selected from the group consisting of $C_{1-4}$ alkylene, $C_{2-4}$ alkylene having at least one hydroxyl substituent, and a moiety of formula: -Ph-S-Ph- (wherein Ph represents phenylene), provided that Ⓡ in at least one repeat unit represents $C_{2-4}$ alkylene having at least one hydroxyl substituent; and
n is a number of from 30 to 250;
wherein the inorganic nanoparticle is bonded to the polymer through the hydroxyl on Ⓡ, and the weight ratio of the polymer to the inorganic nanoparticle is from 95:5 to 40:60.

2. The polyimidothioethers-inorganic nanoparticle hybrid material of claim 1, wherein X is at least one moiety selected from the group consisting of —CH$_2$—, —S— and —SO$_2$—.

3. The polyimidothioethers-inorganic nanoparticle hybrid material of claim 1, wherein Ⓡ in at least one repeat unit represents $C_{2-4}$ alkylene having at least one hydroxyl substituent and a moiety of formula: -Ph-S-Ph- (wherein Ph represents phenylene).

4. The polyimidothioethers-inorganic nanoparticle hybrid material of claim 3, wherein the $C_{2-4}$ alkylene having at least one hydroxyl substituent is 2,3-dihydroxy-n-butylene.

5. The polyimidothioethers-inorganic nanoparticle hybrid material of claim 1, wherein the weight ratio of the polymer to the inorganic nanoparticle is from 90:10 to 50:50.

6. The polyimidothioethers-inorganic nanoparticle hybrid material of claim 1, wherein the inorganic nanoparticle is selected form one or more of titanium oxide, zirconium oxide, cerium oxide and silicon oxide.

7. The polyimidothioethers-inorganic nanoparticle hybrid material of claim 1, which has a refractive index of 1.63 to 1.80 and a birefringence of 0.0005 to 0.0034.

8. A polyimidothioether intermediate, which has repeat units represented by the following formula (I):

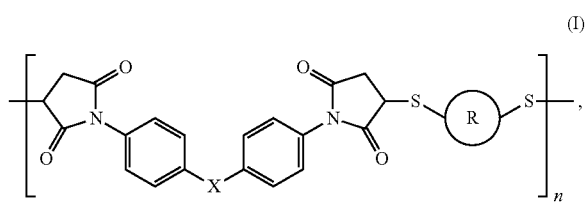

wherein, in the plurality of the repeat units, each X is the same or different and is at least one moiety selected from the group consisting of $C_{1-4}$ alkylene, —S— and —SO$_2$—; and
Ⓡ in each repeat units is the same or different and is at least one moiety selected from the group consisting of $C_{1-4}$ alkylene, $C_{2-4}$ alkylene having at least one hydroxyl substituent, and a moiety of formula: -Ph-S-Ph- (wherein Ph represents phenylene), provided that Ⓡ in at least one repeat unit represents $C_{2-4}$ alkylene having at least one hydroxyl substituent; and
n is a number of from 30 to 250.

9. A method for preparing the polyimidothioether intermediate according to claim 8, which comprises subjecting a bismaleimide of the following formula (II)

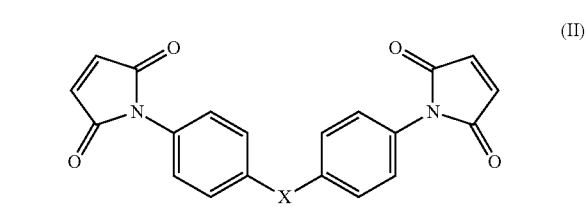

(wherein X is as defined in claim 1) to a Michael polyaddition reaction with a dithiol of the following formula (III):

(wherein Ⓡ is as defined in claim 1),
wherein the molar ratio of the bismaleimide of formula (II) to the dithiol of formula (III) is from 0.90:1.10 to 1.10:0.90.

10. The method of claim 9, wherein the reaction is carried out in the presence of a base catalyst.

11. A method for preparing the polyimidothioethers-inorganic nanoparticle hybrid material according to claim 1, which comprises subjecting the polyimidothioether intermediate of claim 8 to a hydrolysis-condensation with an inorganic nanoparticle precursor through staged heating by using a sol-gel method under acidic conditions, wherein the weight ratio of the polyimidothioether intermediate to the inorganic nanoparticle precursor is from 95:5 to 40:60.

12. The method of claim 11, wherein the inorganic nanoparticle precursor is at least one selected from the group consisting of alkoxide of titanium, zirconium, cerium and silicon.

\* \* \* \* \*